Oct. 9, 1923.
T. RATCLIFFE
FISHING TOOL FOR OIL WELLS
Filed March 22, 1922
1,470,482
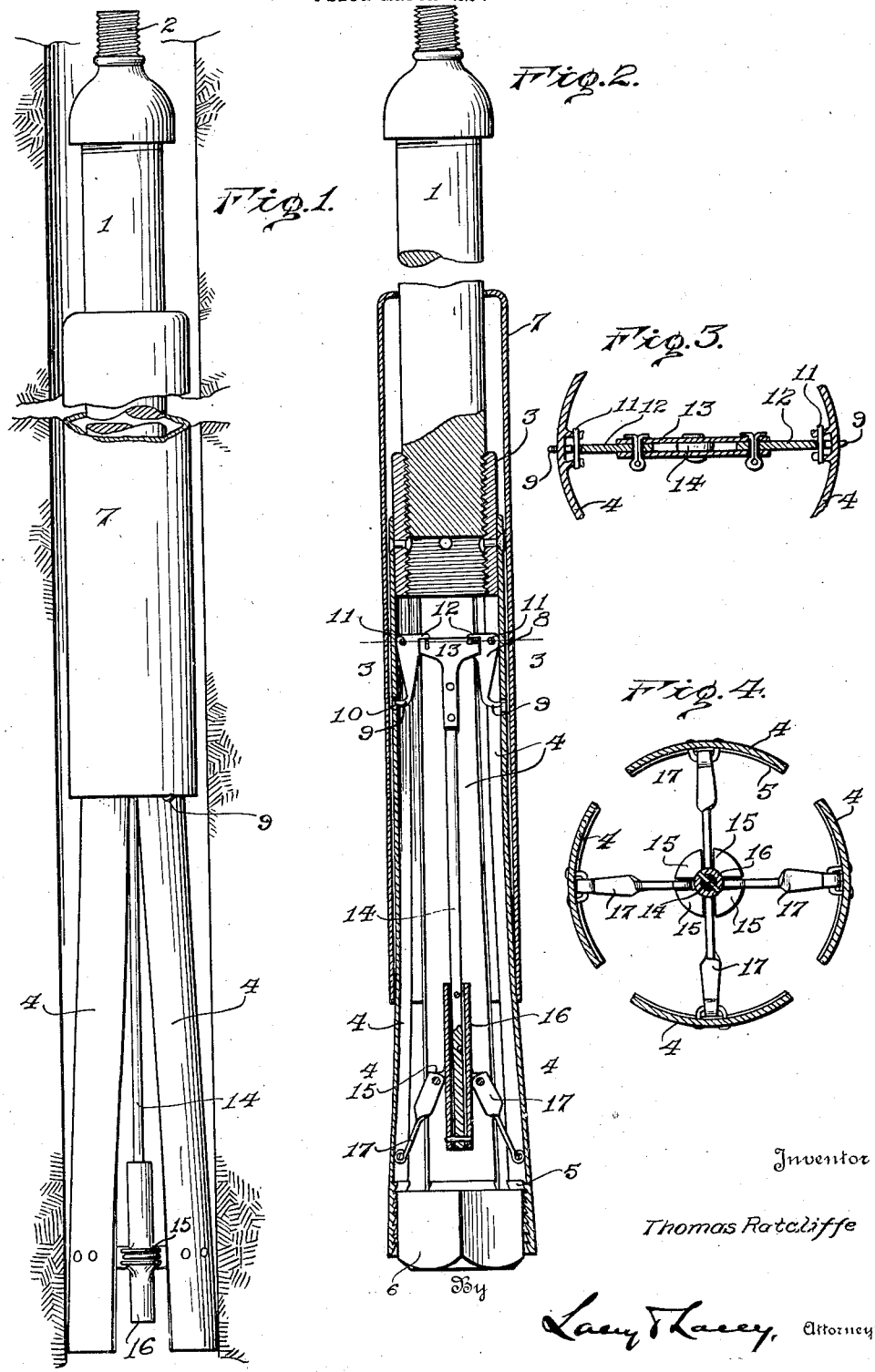
Inventor
Thomas Ratcliffe
By Lacy & Lacy, Attorneys Patented Oct. 9, 1923.

1,470,482

UNITED STATES PATENT OFFICE.

THOMAS RATCLIFFE, OF WAGONER, OKLAHOMA.

FISHING TOOL FOR OIL WELLS.

Application filed March 22, 1922. Serial No. 545,808.

*To all whom it may concern:*

Be it known that I, THOMAS RATCLIFFE, a citizen of the United States, residing at Wagoner, in the county of Wagoner and State of Oklahoma, have invented certain new and useful Improvements in Fishing Tools for Oil Wells, of which the following is a specification.

This invention relates to fishing tools for oil or other deep wells and has for its object the provision of a tool which may be readily lowered into a well and which will be automatically operated to grip a tool or other object which may have been dropped in the well so that upon withdrawal of the fishing tool the lost tool or other object will be withdrawn. The invention is illustrated in the accompanying drawings and will be hereinafter fully set forth.

In the drawings—

Figure 1 is a side elevation, partly broken away, of a fishing tool embodying my improvements;

Fig. 2 is a view, partly in vertical section and partly in elevation, showing the tool in engagement with an object to be withdrawn;

Fig. 3 is an enlarged horizontal section on the line 3—3 of Fig. 2;

Fig. 4 is an enlarged horizontal section on the line 4—4 of Fig. 2.

In carrying out my invention, I employ a stem or head 1 which is suitably constructed at its upper end to be secured upon a lowering rope or cable, as at 2. The lower end of this stem 1 is secured within a collar or ring 3 by engagement of its externally threaded surface with the internally threaded bore of the said ring, as will be readily understood on reference to Fig. 2. This ring or collar 3 has secured thereto and depending therefrom a plurality of resilient gripping arms or grabs 4 which normally spread apart at their lower ends and are equipped at said lower ends on their inner sides with serrated or roughened clamping jaws 5 which are adapted to engage and grip the object to be withdrawn from the well, such as a nut, indicated at 6. Slidably mounted upon the stem 1 is a loose sleeve 7 which has its lower end adapted to encircle the gripping jaws 4 and compress them so as to hold them in clamping engagement with the object to be withdrawn from the well. When the tool is being lowered in the well, this sleeve 7 is supported in the elevated position, shown in Fig. 1, by two or more dogs 8 which have their lower ends 9 projected through openings 10 in the opposite grabs 4 with the lower end of the sleeve resting thereon. These dogs are pivotally mounted, as at 11, upon the inner sides of the grabs 4 and project inwardly from the pivots 11, as shown at 12. The inwardly projecting portions 12 of the dogs are in turn pivotally connected to a head 13 from which a link 14 depends. Upon the lower end of the link 14 are lugs 15 which may be provided upon a sleeve 16 secured around the link 14 in any desired or convenient manner so as to lend additional strength to the link. To the lugs 15, I pivotally attach the inner ends of connecting links 17 which have their outer ends pivoted to the grabs 4 above the jaws 5 of the same.

Normally, the grabs 4 are separated at their lower ends through their own resiliency, and the links 17 approach more or less closely to a horizontal position, these positions of the parts being retained while the tool is being lowered in the well. It will be readily understood that the weight of the sleeve 7 upon the projecting ends 9 of the dogs will exert such frictional pressure upon the dogs that they cannot turn readily upon their pivots. The connections of the dogs with the head 13 and the stem or rod 14 depending from said head will hold said rod in a lowered position so that when the object to be withdrawn from the well is reached, the impact of the lower end of the said rod 14 and the sleeve 16 carried thereby upon the object will shift the said rod and the head 13 upwardly so that the dogs will be swung about their pivots and their lower ends withdrawn from under the sleeve 7, whereupon the sleeve will at once drop by gravity and will ride downwardly upon the grabs and force the lower ends thereof into binding or clamping engagement with the object. This binding engagement will be maintained while the tool is being withdrawn from the well and will continue until the sleeve has been manually moved longitudinally to the point where its lower end may be again engaged and supported by the lower ends of the dogs 8. It will also be readily noted that, when the rod 14 is pushed upwardly by the contact of its lower end upon the object to be withdrawn from the well, the links 17 will be caused to assume a more or less vertical position and will thereby pull the lower extremities of the grabs into engagement with the nut or other object.

My improved tool is very simple in the construction and arrangement of its parts and will automatically engage the object which is to be withdrawn when the latter has been reached in the descent of the tool.

Having thus described the invention, what is claimed as new is:

1. A fishing tool comprising a stem, a plurality of grabs carried by and depending from the lower end of the stem, a compressing sleeve slidably fitted upon the stem above the grabs, and adapted to encircle the grabs, means mounted upon the grabs for normally supporting said sleeve in an inoperative position, and means connected with the grabs for releasing said sleeve-supporting means.

2. A fishing tool comprising a stem, a plurality of grabs depending from the stem, a sleeve slidably fitted upon the stem and arranged to encircle the grabs, a plurality of dogs pivotally mounted upon the inner sides of the grabs and having hooks at their lower ends adapted to project through the grabs and support the sleeve, the upper ends of the dogs projecting inwardly, a rod housed by the grabs and pivotally connected at its upper end with the said dogs whereby to release the dogs from the sleeve upon impact of the rod against an object, and connections between the lower end of said rod and the lower ends of the grabs.

In testimony whereof I affix my signature.

THOMAS RATCLIFFE. [L. S.]